C. H. KEEMER.
SAFETY CAR BRAKE.
APPLICATION FILED JULY 19, 1917.

1,267,555.

Patented May 28, 1918.

Inventor
C. H. Keemer

UNITED STATES PATENT OFFICE.

CHARLES HENRY KEEMER, OF BUFFALO, NEW YORK.

SAFETY CAR-BRAKE.

1,267,555.　　　　　Specification of Letters Patent.　　　Patented May 28, 1918.

Application filed July 19, 1917.　Serial No. 181,549.

*To all whom it may concern:*

Be it known that I, CHARLES HENRY KEEMER, a citizen of the United States, residing at Buffalo, in the county of Erie and State of New York, have invented certain new and useful Improvements in Safety Car-Brakes; and I do hereby declare the following to be a full, clear, and exact description of the invention, such as will enable others skilled in the art to which it appertains to make and use the same.

This invention relates to brakes and more particularly to car brakes and the primary object of the invention is the provision of means for applying the brakes to the front and rear pairs of wheels of each truck simultaneously and with one operation.

Another object of the invention is the provision of means for increasing the power for applying the brakes and for applying the brakes by means of a lever which throws the brake shoes in frictional engagement with the front and rear wheels of the truck.

A further object of the invention is the provision of a car brake system which is durable and efficient in use, simple and easy to manufacture and one that can be placed upon the market at a reasonable price.

With these and other objects in view, the invention consists in the novel construction and arrangement of parts as will be hereinafter specifically described, claimed and illustrated in the accompanying drawing forming a part thereof, in which—

Figure 1:
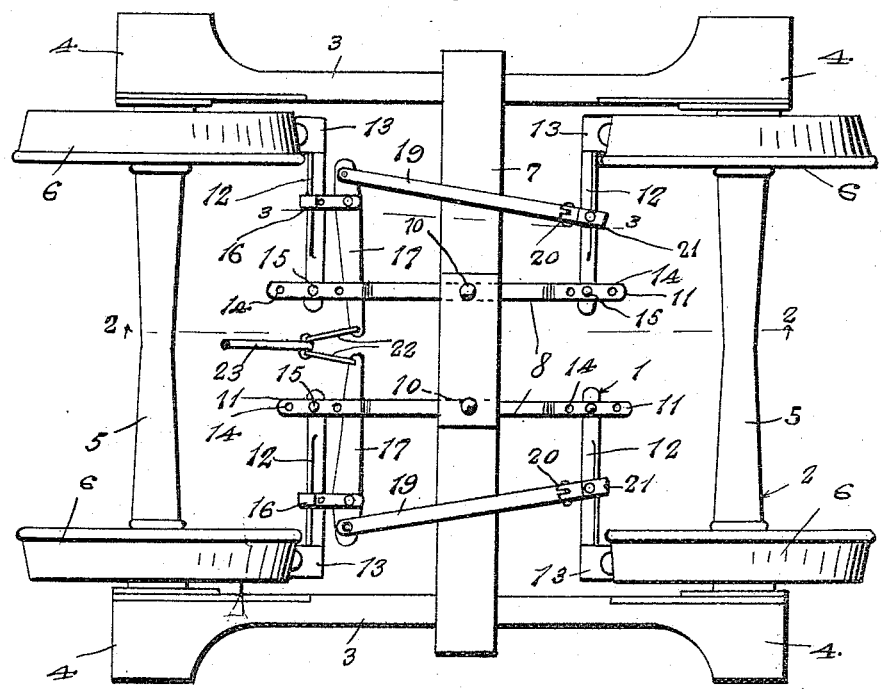
Figure 1 is a plan view of a truck provided with the improved brake system.
Figure 2:
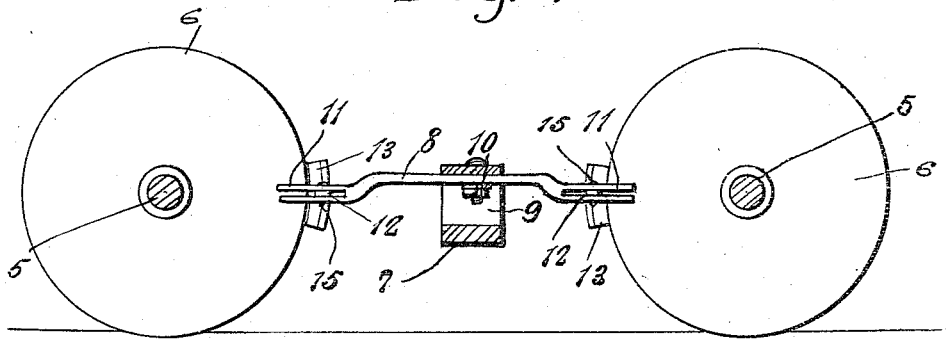
Fig. 2 is a longitudinal section taken on the line 2—2 of Fig. 1.
Figure 3:
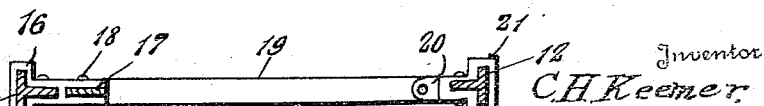
Fig. 3 is a detail sectional view taken on the line 3—3 of Fig. 1.

Referring to the drawing in detail, wherein similar reference numerals designate corresponding parts, throughout the several views, the numeral 1 generally indicates the improved car brake system which is adapted to be applied to an ordinary car truck 2 which includes the side bars 3 supported on the journal boxes 4 in which the ends of the axles 5 are mounted that are carried by the wheels 6. The side bars 3 are connected by the bolster 7 which is of ordinary or any preferred construction.

The improved brake system 1 includes the parallel supporting bars 8 which are extended through a slot 9 formed in the bolster 7 and are held in position by means of pins 10 extended through registering apertures formed in the bars and the bolster. The ends of the supporting bars 8 are bent downwardly and then outwardly and bifurcated as at 11 to receive the ends of the brake levers 12 of which there are four in number and arranged in pairs on each side of the bolster. The outer ends of the brake levers 12 carry the brake shoes 13 which are of the usual or any preferred construction and the inner ends are provided with a recess which is adapted to register with any one of a series of apertures 14 formed in the bifurcated ends 11 of the supporting bars 8 and the registering apertures receive pivot pins 15 which are adapted to support the brake levers in pivotal connection with the supporting bars. The brake levers 12 are preferably formed of T-beams and the brake levers on one side of the bolster 7 have secured thereto connector clips 16, which have their free ends extended and each one of the same receives a floating operating lever 17. The operating levers 17 are pivotally secured adjacent the outer ends thereof to the free ends of the clips 16 by means of pivot pins 18 which extend through registering apertures formed in the operating levers and the clips. The free outer ends of the operating levers 17 have pivotal connection with the link bars 19 which extend over the bloster 7 and are pivotally secured as at 21 to the free ends of the connecting clips 21 which are secured to the brake levers 12 on opposite sides of the bolster intermediate the ends thereof.

The operating levers 17 rest on the supporting bars 8 and the inner ends thereof are pivotally connected to links 22, which are pivotally secured to a central operating rod 23, which may be connected with any suitable form of operating mechanism, so that the brake may be applied by hand or other means.

In operation of the improved device, when it is desired to apply the brakes, the operating rod 23 is moved in a direction away from the bolster 7 which swings the floating operating levers 17, whereby the brake levers 12, which are pivotally connected intermediate the ends of the operating levers 17 by means of the connecting clips 16, are forcibly swung on their pivots 15 and into engagement with the wheels of the truck, and the brake levers 12, which are pivotally secured on the opposite side of the bolster 7 and are pivotally secured to the free outer ends of the operating levers 17 by means of the connecting links 19, are thrown in the opposite directions and carry the brake levers 12 on the opposite side of the bolster into forcible engagement with the wheels of the truck. Thus it will be seen that the brakes are thrown into engagement with both pairs of wheels of the truck simultaneously by means of the pivoted operating levers.

In practice, I have found that the form of my invention, illustrated in the accompanying drawing and referred to in the above description, as the preferred embodiment, is the most efficient and practical; yet realizing the conditions concurrent with the adoption of my device will necessarily vary, I desire to emphasize the fact that various minor changes in details of construction, proportion and arrangement of parts may be resorted to, when required without sacrificing any of the advantages of my invention as set forth.

What is claimed is:—

In a car brake system, the combination with a truck including side bars, and a bolster connecting the same, said bolster having a transverse slot formed therein, a pair of spaced parallel arranged supporting bars extended through said slot, said supporting bars having their free ends bent downwardly and forwardly, brake levers pivotally and adjustably carried by the free ends of said supporting bars, operating levers for said brake levers, a connecting link secured to the free ends of said operating levers and connected to certain of said brake levers intermediate the ends thereof, and connecting links pivotally secured to the operating levers intermediate the ends, and to said brake levers, as and for the purpose specified.

In testimony whereof I affix my signature in presence of two witnesses.

CHARLES HENRY KEEMER.

Witnesses:
 ARTHUR MILLER,
 RUTH MILLER.

Copies of this patent may be obtained for five cents each, by addressing the "Commissioner of Patents, Washington, D. C."